United States Patent
Balakrishnan et al.

(10) Patent No.: US 7,933,602 B1
(45) Date of Patent: Apr. 26, 2011

(54) METHOD AND SYSTEM FOR CONTROLLING THE RATE OF VERTICAL HANDOFF OPERATIONS

(75) Inventors: Swaminathan Balakrishnan, San Diego, CA (US); Jason P. Sigg, Olathe, KS (US); Ashish Bhan, Shawnee, KS (US); Ajay Manghat, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 817 days.

(21) Appl. No.: 11/865,835

(22) Filed: Oct. 2, 2007

(51) Int. Cl.
*H04W 36/00* (2009.01)
*H04W 4/00* (2009.01)
*H04W 72/00* (2009.01)

(52) U.S. Cl. ............... 455/437; 455/436; 455/435.2; 455/452.2; 370/332

(58) Field of Classification Search ............ 455/552.1, 455/553.1, 452.1, 452.2, 436, 437, 443, 444; 370/332, 335, 342
See application file for complete search history.

(56) References Cited

U.S. PATENT DOCUMENTS

| | | | |
|---|---|---|---|
| 6,728,217 B1 * | 4/2004 | Amirijoo et al. | 370/252 |
| 6,738,373 B2 * | 5/2004 | Turner | 370/352 |
| 2005/0201382 A1 * | 9/2005 | Xue et al. | 370/395.21 |
| 2005/0265236 A1 * | 12/2005 | Kwon et al. | 370/235 |

* cited by examiner

*Primary Examiner* — Un C Cho

(57) ABSTRACT

A method and system for controlling the rate at which access terminals hand off from an IS-2000 (e.g., 1xRTT) communication system to an IS-856 (e.g., EVDO) communication system. A base station determines metric indicative of the rate at which hybrid access terminals hand off to the IS-2000 from the IS-856 system, and then based at least in part on the metric, dynamically adjusts a dormancy period that at least one hybrid access terminal must wait before entering a dormant mode in which is looks for service under IS-856. As the rate-metric indicates a higher or lower rate, the system may responsively adjust the dormancy period down or up. The rate at which hybrid access terminals operating under IS-2000 may seek service under IS-856 may thus be tuned to the rate at which they hand of form IS-856 to IS-2000.

24 Claims, 4 Drawing Sheets

METHOD AND SYSTEM FOR CONTROLLING THE RATE OF VERTICAL HANDOFF OPERATIONS

FIELD OF THE INVENTION

The present invention relates to wireless communications and, more particularly, to vertical handoff of data communication sessions, i.e., handoff of data sessions from one air-interface protocol to another air-interface protocol. The invention is particularly useful for dynamically adjusting the rate of handoffs from IS-2000 (e.g., 1xRTT) to IS-856 (e.g., EV-DO), but the invention may extend to other vertical handoff scenarios as well.

BACKGROUND

In a typical cellular radio communications system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) or packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal communicates via an RF air interface with the BTS antenna of the cell. Consequently, a communication path is established between the access terminal and the transport network, via the air interface, the BTS, the BSC and the switch or gateway.

With the explosive growth in demand for wireless communications, the level of call traffic in most cell sites has increased drastically over recent years. To help manage the call traffic, most cells in a wireless network are usually further divided geographically into a number of sectors, each defined respectively by radiation patterns from directional antenna components of the respective BTS, or by respective BTS antennae. These sectors (which can be visualized ideally as pie pieces) can be referred to as "physical sectors," since they are physical areas of a cell site. Therefore, at any given instance, an access terminal in a wireless network will typically be positioned in a given physical sector and will be able to communicate with the transport network via the BTS serving that physical sector.

As an access terminal moves between coverage areas, such as sectors, of a wireless communication system, or when network conditions change or for other reasons, the access terminal may "hand off" from operating in one coverage area to operating in another coverage area. In a usual case, this handoff process is triggered by the access terminal monitoring the signal strength of signals that it is receiving in various available coverage areas, and the access terminal or the BSC determining when one or more threshold criteria are met. For instance, the access terminal may monitor signal strength in various available coverage areas and notify the BSC when a given coverage area has a signal strength that is sufficiently higher than the coverage area in which the access terminal is currently operating. The BSC may then direct the access terminal to hand off to that other coverage area.

In some cases, more than one air interface communication protocol might be implemented in a given market area. For instance, as will be described more below, a given market area might provide both legacy CDMA coverage under a standard protocol such as EIA/TIA/IS-2000 Rel. 0, A or other version thereof (hereafter "IS-2000") and also high data rate coverage according to a standard protocol such EIA/TIA/IS-856 Rel. 0, A, or other version thereof (hereafter "IS-856"). In such a system, an access terminal might not only hand off between coverage areas under a common air interface protocol (e.g., between IS-2000 sectors) but may also hand off between the different air interface protocols, such as between IS-2000 and IS-856. Handoff between different air interface protocols (or, more generally, between different access technologies) is known as "vertical" handoff.

To facilitate vertical handoff, an access terminal operating under a given air interface protocol might be arranged to periodically check for availability of service under another air interface protocol. By way of example, an access terminal operating under IS-856 might periodically check for availability of IS-2000 service. Further, when the signal strength of the available IS-2000 service is sufficiently higher than the signal strength of the existing IS-856 service, the access terminal may hand off from the IS-856 system to the IS-2000 system, typically with approval from the BSC.

SUMMARY

In a conventional dual-protocol or "hybrid" system, as described above, signal strength is used as the basis to trigger vertical handoff of the access terminal. It may also be possible to use monitoring or measurement of other operating conditions, such as achievable data rate, as alternative or additional bases for triggering vertical handoff. In any case, an access terminal communicating via one interface of a hybrid system may need to be in an appropriate or specific operational state before it monitors for the conditions that might trigger a handoff to the other interface. For instance, in a hybrid IS-2000/IS-856 system, an access terminal connected via the IS-2000 interface must transition to a "dormant" state before it first checks for availability of service via the IS-856 interface, and then, if IS-856 service is available, monitors for proper conditions (e.g., power and/or data rate) the might trigger a handoff from IS-2000 to IS-856.

It should be understood from the discussion so far that an access terminal must be capable of operating under both air interface protocols of a hybrid system, or, if the system supports more than two protocols, at least under those of the hybrid system between which the hybrid access terminal seeks to hand off. Such an access terminal shall be referred to herein as a "hybrid access terminal." Since a vertical handoff is between two air interface protocols, there is no loss in generality in considering just two air interface protocols of a hybrid system, even if the system supports more than two. Further, while the present disclosure primarily describes methods and operations relating to hybrid access terminals, a hybrid system may nevertheless also support communications with "single-mode access terminals" that can operate exclusively under just one of the hybrid system's air interface protocols. The more general term "access terminal" shall be used herein to refer to all types of access terminals, including both hybrid and single-mode. In particular, "access terminal" shall be used when a distinction between the different types is not necessary, or when an aspect of the system or operations under discussion applies to either or both types.

In practice, a hybrid system may maintain a dormancy timer for each access terminal currently operating in the system. When a given hybrid access terminal with an IS-2000-based packet-data connection becomes inactive, as determined for example by a network element such as a BSC, the system starts a dormancy timer for the hybrid access terminal. Here, inactivity is defined as the absence of packet transmissions to or from the hybrid access terminal. The dormancy timer continues to run until either the hybrid access terminal resumes packet transmission activity, or a "dormancy period" passes with no further activity to or from the hybrid access terminal and the dormancy timer consequently expires. If the hybrid access terminal resumes packet transmission activity before the timer expires, then the IS-2000-based packet data connection remains intact, the hybrid access terminal remains in IS-2000 mode, and no vertical handoff can be triggered. In this case, the dormancy timer is also cancelled. If, instead, the dormancy timer expires before the hybrid access terminal resumes activity, the system (e.g., the BSC) releases any IS-2000 air interface channels allocated to the hybrid access terminal for packet data transmissions. Upon detection of the release by the system of its air interface channels, the hybrid access terminal enters a dormant state. As described above (and detailed further below), the hybrid access terminal may then check for the availability of IS-856 service, and if found, may initiate a vertical handoff subject to detection of the appropriate operating conditions.

Circumstances may arise in which a hybrid access terminal is operating under conditions that would trigger a vertical handoff to a more advantageous interface of a hybrid system, but is not in an operational state that will allow it to check for the availability of service via the advantageous interface. In particular, as described for the case of a hybrid IS-2000/IS-856 system, a hybrid access terminal connected via the IS-2000 interface may not begin the process of checking for IS-856 service in preparation for a possible vertical handoff unless it is in a dormant state—that is, until it has been inactive for at least one dormancy period, as determined by expiration of a dormancy timer. The hybrid access terminal must therefore remain inactive for at least one dormancy period before it even has a chance for a vertical handoff to the IS-856 interface, even though its immediate operating conditions may be consistent with such a handoff. Moreover, if the hybrid access terminal re-engages in active data communications before the dormancy period passes, its next possible chance for vertical handoff will not occur until at least one dormancy period after it again becomes inactive (since the dormancy timer is cancelled if activity resumes before it expires). In other words, intervals of inactivity that are shorter than the dormancy period can suppress the frequency of opportunities for vertical handoff.

Since the IS-856 interface supports higher forward data rates than the IS-2000 interface, intervals of inactivity that are shorter than the dormancy period can thus give rise to an overall reduction in data rates attainable by a hybrid access terminal during times when network capacity for higher rates may be available. This in turn corresponds to a reduced efficiency of data transport in the hybrid network. When a plurality of hybrid access terminals operating in a hybrid IS-2000/IS-856 system are engaged in data communications, the inefficiency just described is multiplied even further. Furthermore, hybrid access terminals engaging in data communications under IS-2000 utilize many of the same network resources required for cellular voice communications under IS-2000. Consequently, time spent by hybrid access terminals operating under IS-2000 for data communications when they could be operating under IS-856 potentially represents inefficiencies in the relative allocation of IS-2000 resources between data and cellular voice services. It would therefore be advantageous for the owner or operator of such a hybrid system to be able to increase the frequency of opportunities for vertical handoffs to IS-856 of hybrid access terminals operating in the system.

Accordingly, the present invention is directed to a method and system for controlling the frequency of vertical handoff operations in a hybrid wireless communications system. In particular, in an exemplary embodiment of the present invention, a base station (or other network element) in a hybrid system will dynamically adjust the duration of the dormancy period that it applies to hybrid access terminals so as to cause them to seek vertical handoff to an advantageous interface in a more efficient manner than that corresponding to a fixed duration. Consequently, hybrid access terminals operating in a hybrid system will spend an increased proportion of time utilizing the advantageous air interface for packet-data transmissions when compared with operation in systems with fixed dormancy periods. An improvement in the efficiency of packet-data communications both for individual hybrid access terminals and the system as a whole, as well as an improvement in the efficiency of network resource allocation, will result.

Hence, in one respect, an exemplary embodiment of the invention provides a method that is carried out in a hybrid wireless communication system, wherein the method comprises determining a metric that is indicative of a rate at which hybrid access terminals operating under a first air interface protocol are handed off to a second air interface protocol, and then, based at least on the determined metric, adjusting a time period that at least one hybrid access terminal operating under the second air interface protocol must wait before entering an operational state in which it looks for service under the first air interface protocol. The hybrid wireless communication system comprises at least a first air interface protocol and a second air interface protocol, wherein hybrid access terminals are capable of operating under both air interface protocols for data communications with the wireless communication system. In a preferred embodiment, the first air interface protocol is IS-856, and the second air interface protocol is IS-2000. However, other air interface protocols are possible.

The metric that is indicative of the rate at which hybrid access terminals are handed off from the first to the second air interface protocol could determined in a variety of ways. For instance, it may be computed as a ratio of (i) a subtotal number of hybrid access terminals currently operating under the second air interface protocol that each began their current operations under the second air interface protocol following a handoff from the first air interface protocol to (ii) a total number of access terminals currently operating under the second air interface protocol, the ratio corresponding to the metric. The subtotal number could be determined by maintaining a historical record of handoffs, and interpreting the information in the record so as to yield the subtotal number. The historical record could be maintained or generated from information in one or more network components, including, for example an Authentication-Authorization-Accounting (AAA) server, a Packet Data Serving Node (PDSN), a Base Station Controller, a Base Station Manager, an Element Management Subsystem, and a Radio Network Controller.

Further, adjusting the time period may then be accomplished by determining that the ratio is within a particular range of values, and setting a value for the time period equal to a time-duration value associated with the particular range. Thus, a set of non-overlapping ranges of ratio values could be associated with a corresponding set of time-duration values.

As a further aspect of the preferred embodiment, the operational state of the hybrid access terminal could correspond to a dormant state, and the time period could be measured by a dormancy timer that is set to expire upon passage of a dormancy period. During the dormancy period ticked out by the timer, the hybrid access terminal is inactive, neither sending nor receiving any packet data to or from the wireless communication system. Thus, adjusting the time period may be accomplished by setting the dormancy period to a value determined based at least on the metric (and possibly other factors).

In another respect, another exemplary embodiment of the invention provides a method that is carried out in a hybrid cellular wireless communication system of a type providing both IS-2000 coverage and IS-856 coverage, wherein a radio access network comprising at least one base station serves a hybrid access terminal that is capable of operating under IS-2000 and IS-856, and wherein the method comprises computing a ratio of (i) a subtotal number of hybrid access terminals currently operating under IS-2000 that each began their current operations under IS-2000 following a handoff from IS-856 to (ii) a total number of access terminals currently operating under IS-2000; and based at least on the ratio, adjusting a time period that the hybrid access terminal, when operating under IS-2000, must wait before entering a dormant state in which it looks for service under IS-856. Again, the time period may be measured by a dormancy timer that ticks out a dormancy period during which the hybrid access terminal is inactive, and wherein the value for the dormancy period based at least on the ratio.

In a preferred embodiment, the hybrid access terminal may have an IS-2000 active set of one or more sectors, with the radio access network maintaining for each respective sector a respective dormancy timer associated with the hybrid access terminal, each respective dormancy timer having an associated respective dormancy period. Then, computing the ratio comprises computing a respective sector-ratio for each sector in the hybrid access terminal's IS-2000 active set, each respective sector-ratio comprising a ratio of (i) a sector-subtotal number of hybrid access terminals currently operating in the sector under IS-2000 that each began their current operations under IS-2000 following a handoff from IS-856 to (ii) a sector-total number of access terminals currently operating in the sector under IS-2000. Further, adjusting the time period may then comprise determining respectively for each sector in the hybrid access terminal's IS-2000 active set a respective value for the respective dormancy period based at least on the respective sector-ratio. Additionally, the sector-subtotal number could be determined from a historical record of handoffs, the historical record being generated based on handoff data exchanged between an IS-2000 network entity and an IS-856 network entity.

As a further aspect of the preferred embodiment, one of the sectors in the active set may be considered a primary sector, and the dormancy timer of the primary sector may then be applied to measuring the dormancy period of the hybrid access terminal. Again, the time period may be adjusted by determining that the ratio falls within a range of values associated with a particular dormancy time. A set of non-overlapping ranges and corresponding dormancy-time values could be maintained in look-up table, for instance.

In yet a further respect, another exemplary embodiment of the invention provides a hybrid cellular wireless communication system of a type supporting both IS-2000 coverage and IS-856 coverage, wherein a radio access network comprising at least one base station serves a hybrid access terminal that is capable of operating under IS-2000 and IS-856. In a preferred embodiment, such a system has means for computing a ratio of (i) a subtotal number of hybrid access terminals currently operating under IS-2000 that each began their current operations under IS-2000 following a handoff from IS-856 to (ii) a total number of access terminals currently operating under IS-2000; and for adjusting a time period that the hybrid access terminal, when operating under IS-2000, must wait before entering a dormant state in which it looks for service under IS-856, the adjustment being based at least on the ratio.

Again, the time period may measured by a dormancy timer that ticks out dormancy period during the hybrid access terminal remains inactive. Then, the means for adjusting the time period comprises means for setting a value for the dormancy period based at least on the ratio.

As a further aspect of the preferred embodiment, the hybrid access terminal may have an IS-2000 active set of one or more sectors, where again, the radio access network maintains for each respective sector a respective dormancy timer associated with the hybrid access terminal, each respective dormancy timer having an associated respective dormancy period. Then, the means for computing the ratio comprises means for computing a respective sector-ratio for each sector in the hybrid access terminal's IS-2000 active set, each respective sector-ratio comprising a ratio of (i) a sector-subtotal number of hybrid access terminals currently operating in the sector under IS-2000 that each began their current operations under IS-2000 following a handoff from IS-856 to (ii) a sector-total number of access terminals currently operating in the sector under IS-2000. Additionally, the means for adjusting the time period further then comprises means for determining respectively for each sector in the hybrid access terminal's IS-2000 active set a respective value for the respective dormancy period based at least on the respective sector-ratio.

The system may further incorporate means for implementing other functionality described above and in greater detail below.

These and other aspects, advantages, and alternatives will become more apparent to those of ordinary skill in the art by reading the following detailed description, with reference where appropriate to the accompanying drawings. Further, it should be understood that this summary and other descriptions throughout this document are intended to explain the invention by way of example only and are not intended to restrict the scope of the invention as claimed. For instance, structural elements and process steps can be rearranged, combined, distributed, eliminated, or otherwise changed, while remaining within the scope of the invention as claimed.

DETAILED DESCRIPTION

The present invention will be described by way of example with reference to hybrid IS-2000/IS-856 communications. Note that IS-2000 is also commonly referred to as "1xRTT" (an acronym for "One times Radio Transmission Technology"), or sometimes just "1x" for short. Similarly, IS-856 is also commonly referred to as "EVDO" (an acronym for "Evolution-Data Optimized"), or sometimes just "DO" for short. The alternative terms (1x and DO) are sometimes used in the following description where appropriate for consistency with customary naming conventions of certain network elements. In addition, it should be understood that the invention can extend to apply in other hybrid systems as well, such as with respect to other air interface protocols for instance.

1. Cellular Wireless Packet Data Communications

Figure 1:
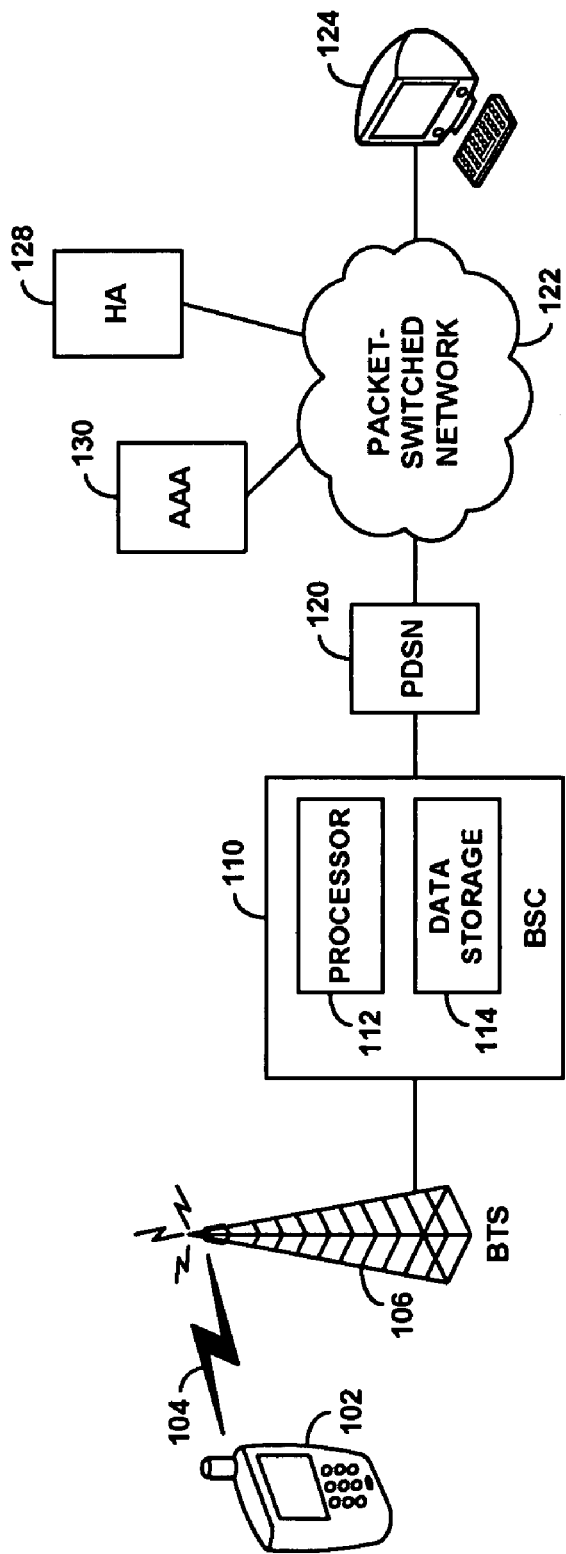
FIG. 1 is a simplified block diagram of a wireless communication system in which an exemplary embodiment of the invention can be implemented.

FIG. 1 depicts an example cellular wireless communication system adapted to provide wireless packet data communication service for an access terminal 102. Access terminal 102 communicates over an air interface 104 with a BTS 106, which is then coupled or integrated with a BSC 110. BSC 110 is then coupled with a PDSN 120, which provides connectivity with a packet-switched network 122 such as the Internet and/or a wireless carrier's private core packet-network. Sitting as nodes on network 122 are, by way of example, a remote computer 124, an Authentication-Authorization-Accounting (AAA) server 130, and a mobile-IP home agent (HA) 128.

With this arrangement, after being authenticated by AAA server 130, HA 128 may assign an IP address for use by access terminal 102, and access terminal 102 may then engage in packet-data communications with entities such as remote computer 124, via a communication path comprising air interface 104, BTS 106, BSC 110, PDSN 120, and network 122.

Figure 2:
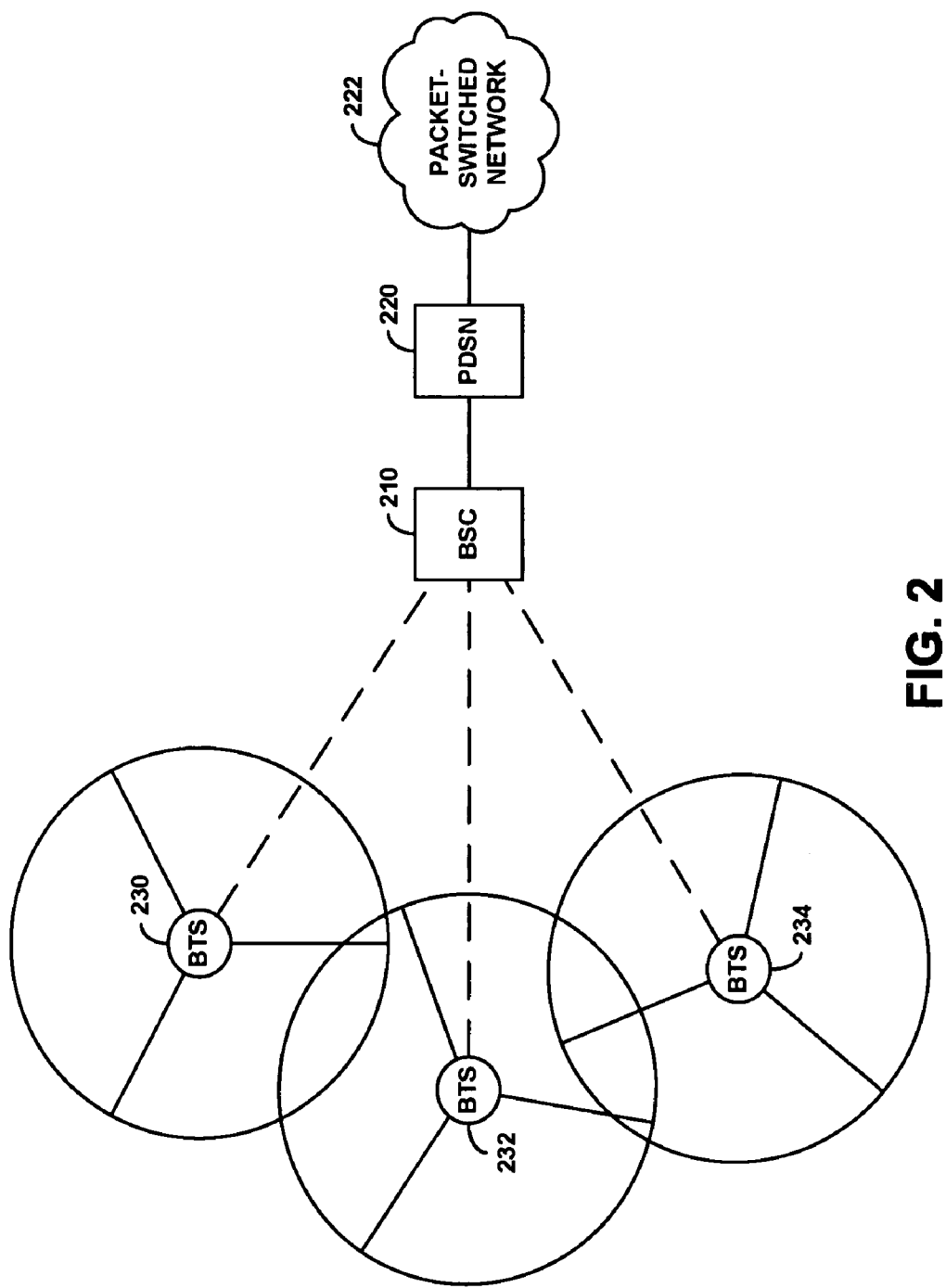
FIG. 2 is another simplified block diagram of a wireless communication system in which the exemplary embodiment can be employed.

In practice, BSC 110 may serve multiple BTSs. Each BTS may then radiate to define a given cell and a plurality of cell sectors. FIG. 2 illustrates this arrangement. As shown in FIG. 2, BSC 210 is coupled with three BTSs 230, 232, 234. Each BTS is shown at the core of a respective circle representing a cell, and each cell is divided into three pie-pieces representing sectors. With this arrangement, an access terminal can operate in any of the sectors and can communicate on packet network 222 via its serving BTS, and via BSC 210 and PDSN 220.

Throughout this description, the term "base station" will refer to a radio access network element such as a BTS, a BSC, or combination BTS/BSC, for instance. A base station may include other elements and may take other forms as well. The term "radio network controller" (RNC) may also be used to refer to a BSC or more generally to a base station, usually in the context of IS-856 communications.

Preferably, the invention will be carried out by a base station, such as by BSC 110 for instance. In this regard, FIG. 1 shows that BSC 110 includes a processor 112 and data storage 114. Processor 112 may comprise one or more general purpose processors (e.g., microprocessors) and/or one or more dedicated, special-purpose processors (e.g., DSP chips, or the like). Data storage 114, in turn, may comprise one or more volatile and/or non-volatile data storage components (e.g., magnetic, optical, and/or organic storage) and may be integrated or connected with processor 112. Although not shown in the figure, data storage 114 preferably contains program instructions that define one or more routines executable by processor 112 to carry out various functions described herein. As such, the processor, data storage, and/or instructions may be considered to define means for carrying out the various functions. However, it should be understood that other elements of the wireless communication system shown in FIG. 1 may similarly comprise hardware and software components which define additional and/or alternative means for carrying out the various functions and steps described herein.

2. Legacy CDMA Communications

In a conventional or "legacy" Code Division Multiple Access ("CDMA") wireless network compliant with the well known industry standards TIA/EIA/IS-95 and TIA/EIA/IS-2000, each cell employs one or more carrier frequencies, typically 1.25 MHz each, and each sector is distinguished from adjacent sectors by a pseudo-random number offset ("PN offset"). Further, each sector can concurrently communicate on multiple different channels, distinguished by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-95 or IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

With this arrangement, an access terminal can be arranged to engage in packet-data communications. To do so, the access terminal first sends a packet-data origination request over the access channel and via the BTS 106 and BSC 110 to an MSC (not shown). The MSC then signals back to the BSC directing the BSC to assign an air interface traffic channel for use by the access terminal, and the BSC signals to the PDSN 120. The PDSN 120 and access terminal 102 then negotiate to establish a data link layer connection, such as a point to point protocol (PPP) session. Further, the PDSN 120 sends a foreign agent challenge message to the access terminal, and the access terminal responds with a mobile-IP registration request (MIP RRQ), which the PDSN forwards to HA 128. The HA then assigns an IP address for the access terminal to use, and the PDSN passes that IP address via the BSC to the access terminal.

Once the access terminal has a radio link (an assigned traffic channel), a data link, and an IP address, the access terminal is considered to be in an "active" mode. To conserve air interface resources, however, an IS-2000 system is typically arranged to release the access terminal's assigned traffic channel after a certain time period of inactivity time during which no data traffic passes to or from the access terminal through the PDSN. Upon release of the access terminal's radio link, the access terminal is considered to be in a "dormant" mode or state, in which it lacks a radio link but still has a data link and an IP address.

The time period that an access terminal must remain inactive before entering a dormant state is referred to as a "dormancy period," and the determination that a given access terminal has been inactive for a dormancy period is measured by a dormancy timer. In practice, an IS-2000 system will maintain at least one dormancy timer for each access terminal operating in the system, usually in the base station or other controlling component. Dormancy timers may be deployed on a sector level, so that a given access terminal may have a separate associated timer maintained by each sector with which it communicates. Typically, a single, fixed dormancy period is applied to all timers associated with all access terminals in the system. For example, a value for the dormancy period may be set according to a system parameter. When the system detects that a given access terminal has become inactive (e.g., the access terminal stops transmitting data to the system and the system has no data to transmit to the access terminal), the system sets the access terminal's dormancy timer with an expiration time equal to the dormancy period.

If the access terminal becomes active again before the timer expires (or possibly exactly as the timer expires)—i.e., the inactivity period of the access terminal is shorter than (or possibly equal to) the dormancy period—then the timer is cancelled and the system recognizes the access terminal to still be in its active mode. In this case, the system does not release any of the air resources allocated to the access terminal. Additionally, the next time the access terminal becomes inactive, the timer will be reset again with the dormancy period; that is, inactivity periods that are shorter than the dormancy period are not accumulated from one setting of the timer to the next.

If instead the timer expires while the access terminal remains inactive—i.e., the inactivity period exceeds the dormancy period—then the system recognizes the access terminal to have entered its dormant state. In this case, the system releases the access terminal's assigned traffic channel, as described above.

While in the dormant state, if the access terminal seeks to transmit packet-data from its IP address, the access terminal would re-acquire a radio link by sending a new origination request message to the BSC. Similarly, if the PDSN receives packet-data destined for the IP address of a dormant access terminal, the PDSN would notify the BSC, the BSC would page the access terminal to cause the access terminal to then re-acquire a radio link, and the PDSN would then pass the data along to the access terminal.

Under IS-95 and IS-2000, an access terminal can communicate with a number of "active" sectors at a time. (The term "active" in this context should not be confused with the same term used to describe data communication state as noted above.) Depending on the system, the number of active sectors can be up to three or six (according to current deployments). The access terminal receives largely the same signal from each of the active sectors and, on a frame-by-frame basis, selects the best signal to use.

An access terminal maintains in its memory a list of the sectors in its "active" set. In addition, it maintains in its memory a list of "candidate" sectors (typically up to six), which are those sectors that are not yet in the active set but that have sufficient signal strength that the access terminal could demodulate signals from those sectors. Further, the access terminal maintains a list of "neighbor" sectors, which are those sectors not in the active set or candidate set but are in close vicinity to the access terminal. All other possible sectors are members of a "remaining" set.

To facilitate a determination of which sectors should be in the access terminal's "active" set, all base stations emit a unique pilot signal in the pilot channel of each sector, typically at a power level higher than other forward link signals. The pilot signal typically encodes the PN offset of the corresponding sector. Among an access terminal's active set, one sector—typically the one with the strongest measured pilot signal strength—is designated as the primary sector. An access terminal then constantly measures the strength of each pilot signal that it receives and notifies a primary base station (a base station currently serving the access terminal) when pilot strength rises above or falls below designated thresholds. The base station, in turn, provides the access terminal with an updated list of active sectors.

More particularly, in legacy systems, the base station initially provides the access terminal with a Handoff Direction Message (HDM), which indicates (i) the PN offsets of the sectors in the active set and (ii) various handoff parameters that relate to pilot signal strength. Additionally, the base station initially provides the access terminal with a Neighbor List Update Message (NLUM), which identifies the "neighbor" sectors for the current active set.

Note that the strength of the pilot signal associated with a sector is typically measured by the access terminal as a carrier-to-interference ratio, usually designated as $E_c/I_o$ or C/I, or a signal-to-interference-plus-noise ratio, usually designated as SINR. While not necessarily identical in all contexts, $E_c/I_o$, C/I, and SINR are all generally used interchangeably herein as an indicator of sector signal strength.

The access terminal then monitors all of the pilot signals that it receives, and the access terminal determines if any neighbor pilot exceeds a designated threshold strength. If so, the access terminal adds the corresponding sector to its "candidate" set and sends a Pilot Strength Measurement Message (PSMM) to the base station, indicating the estimated $E_c/I_o$ for the pilot of the sector. Depending on current capacity and other issues, the base station may then send an HDM to the access terminal, listing the sector as a new member of the active set. Upon receipt of the HDM, the access terminal then adds the sector associated with the pilot to its active set as instructed, and the access terminal sends a Handoff Completion Message (HCM) to the base station, acknowledging the instruction, and providing a list of the sectors (PN offsets) in its active set.

Similarly, if the access terminal detects that the signal strength of a pilot in its active set drops below a designated threshold, the access terminal starts a handoff drop timer. If the timer expires, the access terminal then sends a PSMM to the base station, indicating the $E_c/I_o$ and drop timer. The base station may then respond by sending an HDM to the access terminal, without the sector's PN offset in the active set. The access terminal would then receive the HDM and responsively move the sector to its neighbor set and send an HCM to the base station.

If dormancy timers are implemented on a sector level, then each sector in the active set of a given access terminal will simultaneously set their respective timers with the dormancy period when the access terminal becomes inactive. With a single value for dormancy period used for all timers, as described above, all the sectors in the access terminal's IS-2000 active set will agree on when the access terminal enters it dormant state.

3. High Rate Packet-Data Communications

Under IS-2000, the highest rate of packet-data communications theoretically available on a fundamental traffic channel of the forward link is 9.6 kbps (under "Radio Configuration 3" (RC3), which provides 64 Walsh codes per sector) or 19.2 kbps (under RC4, which provides 128 Walsh codes per sector). In order to provide higher rate packet-data service to support higher bandwidth applications, the industry has introduced a new "high rate packet data (HRPD) system," which is defined by industry standard IS-856.

IS-856 leverages the asymmetric characteristics of most IP traffic, in which the forward link typically carries a heavier load than the reverse link. Under IS-856, the forward link uses time division multiplexing (TDM), in order to allocate all power in a sector to a given user at any moment, while the reverse link retains largely the traditional IS-2000 code division multiplexing (CDM) format, albeit with the addition of a "data rate control" (DRC) channel used to indicate the supportable data rate and best serving sector for the forward link. The end result is that an access terminal operating under IS-856 can, in theory, receive packet-data at a rate of at least 38.4 kbps and up to 2.4 Mbps. Note that while single-mode, IS-856-only access terminals may operate under IS-856, it is currently more common to deploy hybrid IS-2000/IS-856 access terminals. Hence most of the remaining discussion refers to hybrid access terminals instead of access terminals in general, with the understanding that in describing aspects exclusive to one or the other of IS-2000 and IS-856, the distinction between hybrid access terminals and access terminals of all types may not be critical.

The IS-856 forward link is divided into timeslots of length 2048 chips, and each timeslot is further time division multiplexed to carry various channels, including a pilot channel, a Medium Access Control (MAC) channel, and, if any traffic exists, a forward traffic channel and a "control" channel. As in IS-2000, each sector in IS-856 is defined by a PN offset, and the pilot channel carries an indication of the sector's PN offset. Also as in IS-2000, a hybrid access terminal operating under IS-856 monitors the pilot signal emitted by various sectors as a basis to facilitate active set management, i.e., to facilitate handoff from one sector to another.

IS-856 introduces a "virtual soft handoff" concept, in which a hybrid access terminal communicates with the network on just a "best" sector of its active set at any given time. As in IS-2000, the hybrid access terminal monitors the signal strength of pilot signals emitted by various sectors, and the hybrid access terminal uses threshold handoff parameters such as those noted above as a basis to trigger the addition of a sector to the hybrid access terminal's candidate set. Further as in IS-2000, the hybrid access terminal then sends a revised candidate set to the network, and the network decides whether to revise the hybrid access terminal's active set. If the network decides to update the hybrid access terminal's active set, the network sends an HDM to the hybrid access terminal and further instructs each sector to communicate with the hybrid access terminal.

Unlike IS-2000 in which forward traffic information is routed to all sectors in the hybrid access terminal's active set, however, forward traffic under IS-856 is routed to only a "best" sector that the hybrid access terminal selects from its active set, typically the sector that has the strongest pilot signal (or, more particularly, the highest signal to noise ratio SINR or C/I). In practice, the hybrid access terminal will monitor the pilot signals of the sectors in its active set, and will include in its DRC (on the reverse link) an indication of the selected serving sector. Only that sector will then serve the hybrid access terminal with forward link packets. Thus, a hybrid access terminal may quickly hand off from one IS-856 serving sector to another by simply instructing the base station which sector it intends to communicate with.

Further, the hybrid access terminal will select a data rate based on the SINR (or C/I) that it measures for the selected sector, and the hybrid access terminal will include in its DRC a request to receive forward link communications at that data rate. According to IS-856, the higher the SINR (or C/I), the higher the requested data rate, and the lower the SINR (or C/I), the lower the requested data rate.

Upon receipt of the DRC from the hybrid access terminal, the base station will decide whether or not it will grant the hybrid access terminal's requested forward link data rate. In this regard, the base station will apply a scheduling algorithm to determine which requests to grant and which requests to deny. The scheduling algorithm is vendor-specific and can therefore take various forms. By way of example, one scheduling algorithm may provide for granting the best data rate requested by hybrid access terminals currently requesting data rate. Another scheduling algorithm (the "proportional fairness algorithm") provides for the base station maintaining an average data rate provided to a hybrid access terminal over time, and granting a request to the hybrid access terminal for which the difference between its requested data rate and its average data rate is the greatest. Other examples are possible as well. If the base station decides to grant the request, the base station will then deliver data to the hybrid access terminal at the requested rate (although, in some cases, the actually-delivered forward link data rate may differ from the rate requested and granted).

To acquire packet data connectivity under IS-856, after a hybrid access terminal first detects an IS-856 carrier, the hybrid access terminal sends to its BSC (or "RNC") 110 a UATI (Universal Hybrid access terminal Identifier) request, and receives in response an International Hybrid access terminal Identifier (IMSI), which the hybrid access terminal can then use to identify itself in subsequent communications with the BSC. The hybrid access terminal then sends a connection-request to the BSC 110, and the BSC responsively invokes a process to authenticate the hybrid access terminal and to have the hybrid access terminal acquire a data link.

In particular, with reference again to FIG. 1, the BSC 110 sends an access request to an Access Network AAA (AN-AAA) server (which may be different than the AAA server 130 shown in FIG. 1), and the AN-AAA server authenticates the hybrid access terminal. The BSC 110 then assigns radio resources for the data session, by directing the hybrid access terminal to operate on a particular timeslot traffic channel on the forward link and a particular Walsh coded traffic channel on the reverse link. Further, the BSC signals to the PDSN 120, and the PDSN and hybrid access terminal then negotiate to establish a PPP data link. In addition, as in the IS-2000 process, the hybrid access terminal then sends an MIP RRQ to the PDSN, which the PDSN forwards to the HA 128, and the HA assigns a mobile-IP address for the hybrid access terminal to use.

As in IS-2000, once the hybrid access terminal has acquired an IS-856 radio link, a data link, and an IP address, the hybrid access terminal is considered to be in an active mode. In the active mode, the hybrid access terminal is given full use of the sector power in its assigned timeslot, i.e., each time its timeslot occurs, which facilitates higher rate data communication. Further, as in IS-2000, if the hybrid access terminal does not send or receive data for a defined period of time, the hybrid access terminal enters a dormant mode. In the dormant mode, an IS-856 system maintains the logical state of the hybrid access terminal's session (e.g., IP address, PPP state, and radio link session information), while releasing the hybrid access terminal's radio link resources (e.g., the timeslot that had been assigned for use by the hybrid access terminal). With the maintained session state, the hybrid access terminal can quickly re-acquire a radio link so as to send or receive packet data, thereby giving the appearance that the hybrid access terminal is "always on."

4. Hybrid IS-2000/IS-856 Systems

Given the proliferation of legacy IS-2000 systems, IS-856 was designed to be backwards compatible and to facilitate "hybrid" operation. In this scenario, a hybrid access terminal that can operate on both IS-2000 and IS-856 networks is required. A typical hybrid terminal, for instance, may be capable of receiving voice, short message service (SMS) messages, and dedicated channel data services on IS-2000 networks, as well as high-speed packet data service on IS-856 networks. Note that a hybrid system could support additional or alternative air interface protocols, in which case, a hybrid terminal might also be capable of operation under these additional or alternative protocols. In the context of the exemplary embodiment of a hybrid IS-2000/IS-856 system, a hybrid terminal would be able to operate under at least these two protocols.

In a hybrid system, IS-2000 and IS-856 coverage are provided on different carrier frequencies, each of which is 1.25 MHz in bandwidth for consistency with legacy operation. Further, most IS-856 systems are provided as overlays on existing IS-2000 systems, such that a given BSC provides either IS-2000 coverage or both IS-2000 and IS-856 coverage. For an IS-2000 sector, the BSC may have just an IS-2000 circuit card. For a hybrid IS-2000/IS-856 sector, on the other hand, the BSC may have both an IS-2000 circuit card to facilitate IS-2000 operation and an IS-856 circuit card to facilitate IS-856 operation. A typical hybrid device will be programmed to use an IS-856 data connection when faced with the choice between IS-856 and IS-2000, i.e., when in a hybrid sector.

By standard design, when a hybrid terminal is operating in an IS-856 system, it will also periodically monitor the control channels in the IS-2000 system, in search of any incoming voice calls, SMS messages, or the like, and to monitor IS-2000 pilot signals. In the active IS-856 mode, the terminal periodically (e.g., every 5 seconds) tunes to the frequency of the IS-2000 system to monitor the IS-2000 control channels and then tunes back to the IS-856 frequency to resume the active data session. In the dormant/idle IS-856 mode, the terminal operates in a slotted manner to monitor both the IS-856 control channel and the IS-2000 control channels.

Further, because IS-856 is typically provided as an overlay on an existing IS-2000 system, it is possible that a hybrid terminal may need to hand off from a hybrid sector (providing both IS-2000 and IS-856 coverage) to an IS-2000 sector (providing no IS-856 coverage), e.g., as it moves physically out of a hybrid sector and into an IS-2000 sector. To be able to facilitate such a handoff, when a hybrid terminal is operating in IS-856 it will simultaneously maintain an IS-2000 active set (as will the IS-2000 BSC) as described above. In particular, as the terminal periodically tunes to the IS-2000 frequency, it will monitor the IS-2000 pilots, consider the various threshold parameters described above, send PSMM messages as applicable to the IS-2000 BSC, and receive HDM messages as applicable from the IS-2000 BSC. Thus, when the terminal seeks to hand off from IS-856 to IS-2000, the terminal can readily switch over to operating on one or more of the sectors currently in its IS-2000 active set.

In a hybrid system, handoff from IS-856 to IS-2000 is generally triggered by an analysis of power the SINR (or C/I) ratios of the available IS-856 sectors. In particular, a hybrid terminal will, as noted above, regularly monitor the SINR (or C/I) of available sectors. If the terminal detects that the lowest available SINR (or C/I) is lower than a threshold "PILOT-DROP" level, then the terminal will leave the IS-856 system and begin operating in the IS-2000 system.

If this IS-856 to IS-2000 handoff occurs when the terminal is in an idle/dormant IS-856 mode, then the terminal will simply register in the IS-2000 system and drop its IS-856 radio link. That is, the terminal may request packet data connectivity in the IS-2000 system and consequently obtain an IS-2000 radio link. Further, because the same PDSN and mobile-IP home agent likely serves both the IS-2000 and IS-856 systems, the terminal may simply maintain its existing PPP session and mobile-IP address. As one way to accomplish this in practice, when the terminal acquires an IS-2000 radio link and sends a MIP RRQ to the PDSN, the terminal can include its already-assigned mobile-IP address within the MIP RRQ. When the PDSN receives the MIP RRQ and detects that the terminal already has a mobile-IP address, the PDSN would forego sending the MIP RRQ to HA 130. Instead, the PDSN would responsively work with the IS-2000 BSC (e.g., a packet control function (PCF) of the BSC) to set up a new radio-packet (R-P) tunnel for the IS-2000 connection and would tear down the R-P tunnel that it had with the IS-856 BSC (PCF).

If the IS-856 to IS-2000 handoff occurs when the terminal is in an active IS-856 mode, on the other hand, the terminal will first switch to an IS-856 dormant mode and will then acquire dedicated packet-data connectivity in the IS-2000 system in the manner described in the preceding paragraph.

It is also possible that a hybrid terminal operating in an IS-2000 system may hand off from an IS-2000 sector to a hybrid sector. In this regard, when a hybrid terminal is in a dormant IS-2000 state, the terminal will perform periodic off-frequency searches in an effort to discover existing IS-856 systems. If the terminal thereby finds an IS-856 system, it will acquire IS-856 packet-data connectivity and then operate in the IS-856 system as described above. Existing standards generally do not permit a hybrid terminal that is in an active IS-2000 mode to hand off to IS-856, mainly because, in the active IS-2000 mode, no provision is made for discovering co-existing IS-856 systems. However, once the terminal switches to an IS-2000 dormant mode, it may then lock onto an IS-856 system as described above.

When in an idle IS-2000 mode, if a hybrid terminal locks onto an IS-856 system and acquires packet-data connectivity, the terminal will apply the conventional packet-data connection process, including acquiring an IS-856 radio link, and a PPP link and IP address. When in a dormant IS-2000 mode, the terminal will also apply the conventional packet-data connection process, but, as with a handoff from IS-856 to IS-2000, the terminal may only need to acquire an IS-856 radio link, as the PDSN may recognize that the terminal already has an assigned IP address.

5. Dynamic Adjustment of the Dormancy Period

Because a hybrid access terminal operating under IS-2000 must first be in a dormant state before it may search for an IS-856 system, as described above, such a terminal must be inactive for at least a dormancy period before having an opportunity to hand off to an IS-856 system. Conversely, any period of inactivity of a hybrid access terminal that is shorter in duration than a dormancy period will cause the hybrid access terminal to remain in an IS-2000 active mode, preventing it from searching for an IS-856 system. As such, inactivity periods that are shorter than the dormancy period represent lost, or at least delayed, opportunities for a hybrid access terminal to search for and possibly hand off to an IS-856 system. Since data communications via an IS-856 air interface may be advantageous in terms of achievable forward-link data rates compared with those supported by an IS-2000 air interface, periods of inactivity that are shorter than the dormancy period may thus cause a hybrid access terminal to attain average data rates lower than those supported by the hybrid system. As the number of hybrid access terminals operating under IS-2000 increases, the multiplication of their suboptimal data rates translates into reduced overall system performance and efficiency.

In order to help alleviate this reduced system performance and efficiency related to lost or delayed opportunities of hybrid access terminals to search for and hand off to the IS-856 air interface of a hybrid system, the present invention introduces a dynamically-adjustable dormancy period. More particularly, by adjusting the expiration period of the dormancy timer—i.e., the dormancy period—according to a rate at which hybrid access terminals are handed off from the IS-856 air interface to the IS-2000 air interface of a hybrid system, the rate at which hybrid access terminals hand off back to IS-856 can be tuned so as to improve overall data throughput and system efficiency.

For example, the hybrid system could detect that the rate of IS-856 to IS-2000 handoffs has increased above a particular threshold, and responsively set a shorter dormancy period. In practice, the value of the dormancy period might be a system parameter, so that setting the dormancy period could be achieved by setting the value of the system parameter. A shorter dormancy period would in turn reduce the incidence of lost or delayed opportunities for hybrid access terminals operating under IS-2000 to seek and hand off to the IS-856 system, and thereby lead to a higher overall rate of handoffs back to the IS-856 system and a corresponding increase in usage of its higher data rate forward channels. Conversely, if the system detected a rate of IS-856 to IS-2000 handoffs below a particular threshold, it could responsively increase the dormancy timer. While this would reduce the rate of handoffs back to the IS-856 system, the number of hybrid access terminals affected would be tolerably small, in correspondence with the lower rate of IS-856 to IS-2000 handoffs.

Two embodiments of dynamic adjustment of dormancy period in a hybrid system are described below. In the first, the system applies a common value of dormancy period for each of multiple sectors. In the second, the system respectively applies a distinct value of dormancy timer to each of multiple sectors. Many of the details of the first embodiment below apply to the second as well, and thus will generally not be repeated in the description of the second embodiment. It should be understood that these two embodiments are not intended to be limiting with respect to the scope of present invention, but rather are exemplary.

a. Common Dormancy Period Determined for Multiple Sectors

In an embodiment in which a single, common value of dormancy timer is determined for multiple sectors, a metric indicative of a rate at which hybrid access terminals hand off from IS-856 to IS-2000 in all of the multiple sectors could be determined. Preferably, the multiple sectors will be under the control of a common BSC (or other controlling entity). As an example, the sectors could serve a geographic coverage region, such as all or a portion of a metropolitan area. In this embodiment, the rate (and the metric) could correspond to an aggregate handoff rate to all of the multiple IS-2000 sectors. Then, a single, common dormancy period used to set the duration of all per-access-terminal IS-2000 dormancy timers in each sector could be adjusted based at least on the metric. By way of example, the metric could be a ratio of (i) a subtotal number hybrid access terminals that are handed off from the IS-856 air interface protocol to the IS-2000 air interface protocol to (ii) a total number of all access terminals currently operating under the IS-2000 air interface protocol. A larger value of this ratio would indicate a higher rate of IS-856 to IS-2000 handoffs, while a lower number would indicate a lower rate.

Figure 3:
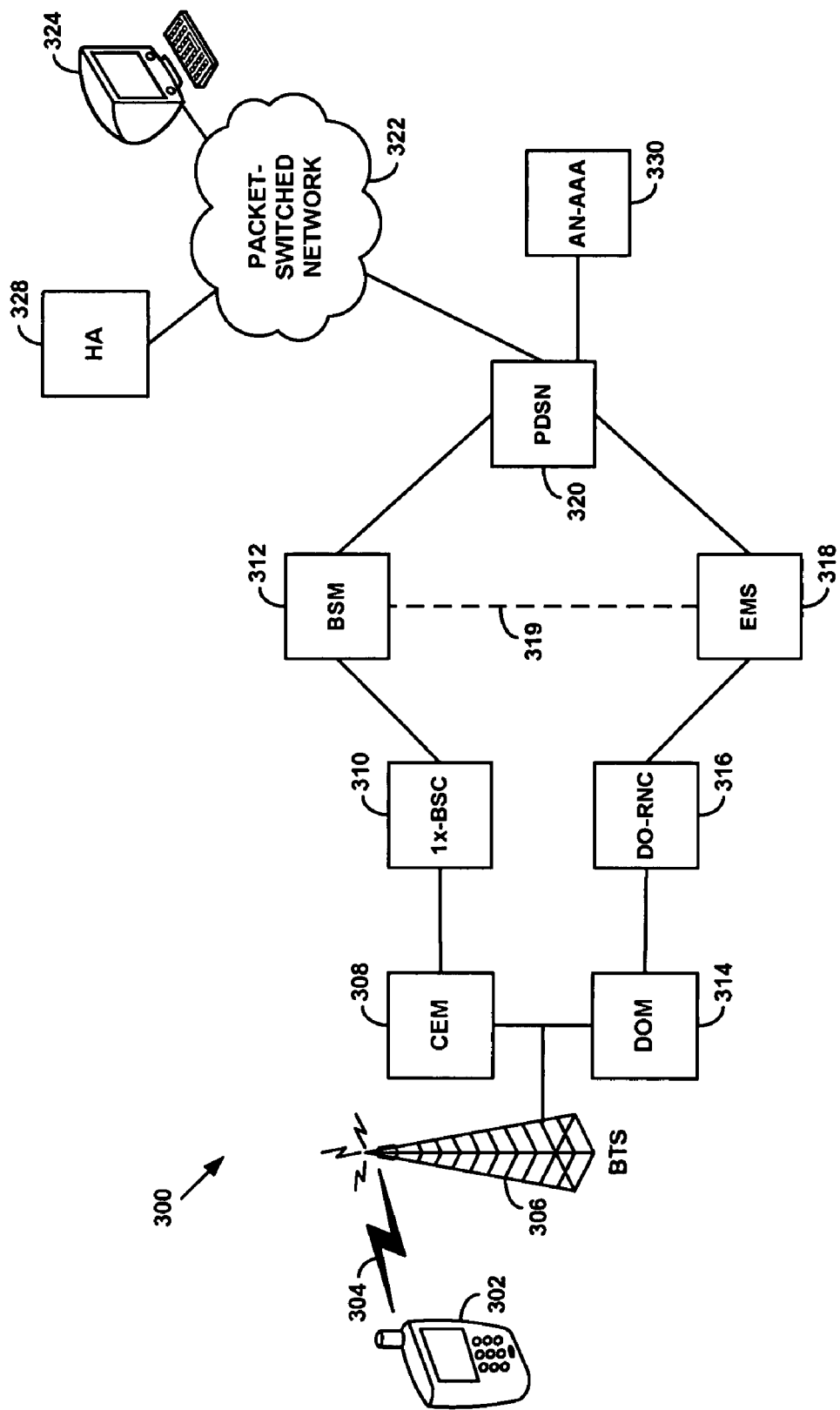
FIG. 3 is a simplified block diagram illustrating certain aspects of a hybrid wireless communication system in which the exemplary embodiment can be employed.

The present embodiment may be further understood with reference to FIG. 3, which shows a simplified representation of radio access network 300 of a hybrid IS-2000/IS-856 system. In network 300, hybrid access terminal 302 communicates by way of radio link 304 with BTS 306, which incorporates Common Element Module (CEM) 308 for IS-2000 air interface support and DO Module (DOM) 314 for IS-856 air interface support. For IS-2000 data communications, BTS 308 is connected to controlling 1x-BSC 310, which in turn is connected to controlling Base Station Manager (BSM) 312. BSM 312 is then connected to PDSN 320, which terminates a packet data link, such a PPP connection, with hybrid access terminal 302, as described above. For IS-856 data communications, DOM 314 is connected to controlling DO-RNC 316, which in turn is connected to controlling Element Management Subsystem (EMS) 318. EMS 318 is also then connected to PDSN 320 for termination of a packet data link.

Similarly to network 200 (FIG. 2), PDSN 320 is connected to packet-switched network 322, which also hosts, by way of example, HA 328 and remote computer 324. PDSN 320 is also connected to Access Network AAA server (AN-AAA) 320, which functions to authenticate and authorize the hybrid access terminal for allocation of data-related network resources.

Network 300 also includes a communication link 319 between BSM 312 and EMS 318, as indicated by the dashed line connecting these two network elements. Depending on the specifics of the deployment, this link (or communicative connection) could be made with a direct physical connection between BSM 312 and EMS 318, or made by way of one or more connecting networks, for example. Other arrangements may be possible as well. As described below, communication link 319 advantageously supports determination of the rate metric introduced above by providing one (though not necessarily the only) means of exchange of information between the 1x and DO systems (also referred to as 1x and DO networks) of the hybrid system.

The multiple sectors of the present embodiment could correspond to one or more of a variety of configurations. For example, in a typical hierarchical deployment, 1x-BSC 310 could control multiple BTSs, each having three sectors. In turn, BSM 312 could control multiple 1x-BSCs. In the discussion below, BSM 312 is taken to be the highest level of the hierarchy, and the one at which determination of the metric and resultant adjustment of the dormancy period are carried out. However, other arrangements and/or configurations are possible as well.

Returning now to the metric indicative of the rate of handoffs from the IS-856 to the IS-2000 system (or from the DO network to the 1x network), the subtotal number of hybrid access terminals that are handed off from the IS-856 air interface protocol to the IS-2000 air interface protocol could be determined from a historical record of such handoffs. This historical record could be generated by BSM 312 using information passed from EMS 318 over communication link 319. For instance, when a hybrid access terminal hands off from IS-856 to IS-2000, it will typically do so without the current data session being disconnected, as described above. Preferably, then, handoff data that identifies a hybrid access terminal and associates it with its data session, such as its Electronic Serial Number (ESN) and its IP address, respectively, will be transferred from EMS 318 to BSM 312 as part of process of handoff from IS-856 to IS-2000. The time stamps of the handoff and of the last active data communication to or from the hybrid access terminal may also be included in the handoff data. Aggregation of the handoff data by BSM 312 could then comprise the historical record of handoffs.

Alternatively or additionally, handoff data could be maintained in a network entity such as PDSN 320 or AN-AAA server 330. In this case, BSM 312 could retrieve the handoff data from one or both of these network entities. Other elements of the hybrid network could be used as well.

Then, in further accordance with the present embodiment, BSM 312 could periodically retrieve information from the historical record in order to determine the subtotal number of hybrid access terminals that handed off from IS-856 to IS-2000. For example, BSM 312 could query the historical record every 10 seconds to obtain an accounting of all hybrid access terminals that have registered in the 1x network in each successive 10-second interval, and by checking the ESN and/or IP address of each such access terminal, determine for each interval the subtotal number of hybrid access terminals that had been operating in the DO network under IS-856 preceding their registration in the 1x network. Dividing the subtotal number in any given interval by the total number of all access terminals operating in the 1x network under IS-2000 in the same interval would then yield the ratio-based rate metric for the given interval.

Note that the total number could include any or all of 1x-only access terminals (i.e., single-mode access terminals), hybrid access terminals that are included in the subtotal, and hybrid access terminals that registered with the 1x network but were not previously registered with the DO network (for example, hybrid access terminals that do not have privileges to operate in the DO network). Note further that the subtotal and total numbers determined for each successive 10-second interval could be cumulative from one interval to the next, and could include decrements as well as increments. In this case, BSM 312 (or some other element in the hybrid system) would preferably track access terminals that leave the 1x network in order to determine a decrement value for each interval. In addition, a historical record of hybrid access terminals handing off from IS-2000 to IS-856 could be maintained is a manner similar to that described above for IS-856 to IS-2000 handoffs.

It will be appreciated that rate calculations of discrete events (such as handoffs) may be carried out in a variety of ways, and be dependent on a number of measurement parameters. For instance, the number of intervals over which the number of handoffs is accumulated could depend on the particular mathematical formula or algorithm being used. Additionally, the interval length during which handoff occurrences are counted could affect the temporal resolution of the calculation. In this sense, it should be understood that the 10-second interval specified above is exemplary, and that other interval lengths could be used as well. Further, the use of cumulative total and subtotal numbers of access terminals is also exemplary. The particular rate metric described above is provided as an example, and should not be viewed as limiting with respect the present invention.

In still further accordance with the present embodiment, after determining the rate metric, BSM 312 (or some other element in the hybrid system) may then dynamically adjust the dormancy period used to set the dormancy timer. In particular, BSM 312 could maintain a lookup table (e.g., in volatile or non-volatile memory) that correlates the rate metric with a dormancy period value. Upon each successive determination of the rate metric (for instance, for each 10-second interval), BSM 312 could consult the lookup table to determine what value should be assigned to the dormancy period. A possible format of such a lookup table is illustrated in Table 1, wherein the first column corresponds to values of the ratio-based rate metric described above and the second column corresponds to the dormancy period value.

TABLE 1

| Metric Value (ratio) | Dormancy Period Value (seconds) |
| --- | --- |
| 0.1 | 10.0 |
| 0.2 | 8.5 |
| 0.3 | 8.0 |
| 0.4 | 7.0 |
| 0.5 | 6.0 |
| 0.5 | 5.0 |
| 0.7 | 5.0 |
| 0.8 | 4.0 |
| 0.9 | 3.0 |
| 1.0 | 2.0 |

Table 1 defines non-overlapping ranges of value of the ratio-base metric, associating a dormancy period value with each range. For instance, values of the ratio in the range from zero to 0.1 would be associated with a dormancy period of 10 seconds; values in the range of 0.1 to 0.2 would be associated with a dormancy period of 8.5 seconds; and so on. A calculated ratio value that happens to exactly equal a particular table value could be assigned the metric value range immediately below the particular table value, except for the case of zero, in which the range of zero to 0.1 would apply. However, cases of exact equality could be handled differently and still be without limiting the present invention.

Once a dormancy period value is determined, BSM 312 would set the dormancy-period system parameter accordingly, and the system would then use this value when setting the expiration time of the dormancy timer. In practice, a separate dormancy timer is typically maintained for each access terminal operating in a given sector, all the timers of a given sector being under the control of the BTS or 1x-BSC that controls the sector. In accordance with the present embodiment, the dormancy-period system parameter could be accessed by and/or distributed to any entity that controls one or more timers, thereby ensuring that all dormancy timers are set using the same value for dormancy period. Thus, as the rate at which hybrid access terminals handed off from IS-856 to IS-2000 increased and decreased above and below range boundaries, the dormancy period used to set the dormancy timer would correspondingly decrease and increase.

b. Distinct Dormancy Period Determined for Each of Multiple Sectors

In an embodiment in which a separate, distinct value of dormancy timer is determined respectively for each of multiple sectors, a distinct metric indicative of a rate at which hybrid access terminals hand off from IS-856 to IS-2000 could be determined respectively for each of the IS-2000 sectors. As with the embodiment described above, the multiple sectors will be under the control of a common 1x-BSC (or other controlling entity). In the present, per-sector embodiment, however, each respective metric would preferably be a ratio of (i) a sector-subtotal number hybrid access terminals that are handed off from the IS-856 air interface protocol to the IS-2000 air interface protocol of a respective sector to (ii) a sector-total number of all access terminals currently operating under the IS-2000 air interface protocol of the respective sector. Here, the sector-subtotal and sector-total are a subtotal and total that applies to a specific sector. Again, a larger value of this ratio would indicate a higher rate of IS-856 to IS-2000 handoffs, while a lower number would indicate a lower rate. Then, a distinct, sector-specific dormancy period would be dynamically adjusted in each respective sector based, at least in part, on the respective metric for that sector.

Nearly all aspects of operation of the aggregate-sector embodiment described in the previous subsection above apply to the present per-sector embodiment as well, except that among any given access terminal's active set, distinct dormancy periods (with possibly disparate values) must now be considered. More particularly, because a given access terminal may typically have (up to) six sectors in its active set, and each active-set sector could have a different value for dormancy period, the system must ensure that only one dormancy-period value is actually applied to all dormancy timers maintained for that access terminal. This may be accomplished by causing each sector in a given access terminal's active set to use the same value of dormancy period when setting that access terminal's dormancy timer, even if each sector has determined a different rate metric and possibly a different dormancy-period value.

In accordance, then, with the present per-sector embodiment, 1x-BSC 310, BSM 312 (or some other network element that maintains and/or has access to access terminals' active sets) may determine a dormancy-period value to apply to given access terminal based on the access terminal's active set. For example, the 1x-BSC or BSM may select the dormancy-period value of the access terminal's primary sector and instruct each of the terminal's active-set sectors to use that value when setting a dormancy timer for that access terminal. In this manner, each access terminal is treated uniformly across its active set with respect to measurement of dormancy period and the subsequent release of air channels allocated by each active-set sector. Note that the selection of the dormancy-period value of the primary sector is exemplary, and other algorithms or heuristics could be applied in the selection. For instance, the dormancy-period value of the sector for which the shortest round-trip delay (between the access terminal and the radiating BTS) is measured could be used instead.

Depending upon whether per-access-terminal timers are maintained on a per-sector basis, and upon the hierarchy of sector-controlling network elements, among other factors, the functions and procedures described herein that are used to advantageously dynamically adjust the dormancy period may be implemented centrally in one network element, or distributed across multiple network elements. This applies to both the aggregate-sector embodiment and the per-sector embodiment. For example, all dormancy timers could be maintained at the BSM, in which case the BSM would centralize all of the functions and procedures. Alternatively, dormancy timers could be maintained at the BSCs, while rate-metric determination and dormancy-period adjustments could be carried out at the BSM, which would then inform the 1x-BSCs of the appropriate timer values. Other arrangements are possible as well. Referring back to BSC 110 in FIG. 1, and in particular to the exemplary internal elements (processor 112 and data storage 114) of BSC 110, it is intended that each of the elements of network 300 that act, in one way or another, to carry out the functions and procedures described above be regarded as, or including, means to carry out the method steps that comprise these functions and procedures.

6. Exemplary Operation

Figure 4:
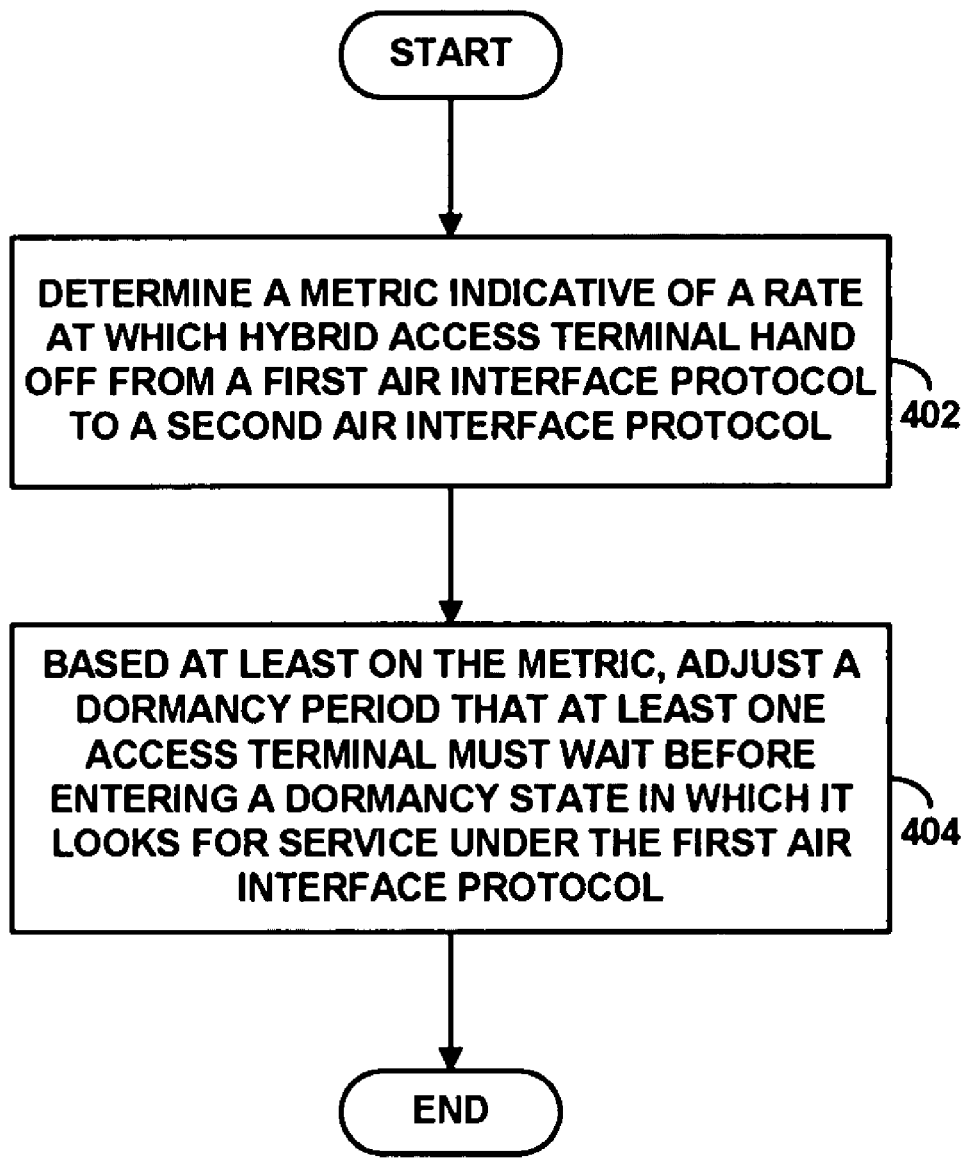
FIG. 4 is a flow chart depicting functions that can be carried out in accordance with the exemplary embodiment.

Exemplary operation of dynamic adjustment of dormancy period is illustrated in FIG. 4, which depicts the steps in the form of a flowchart. At step 402, a metric indicative of the rate at which hybrid access terminals hand off from a first air interface to a second air interface is determined. In accordance with embodiments discussed above, the metric could be determined as a ratio of (i) a subtotal number of hybrid access terminals currently operating under the second air interface protocol that each began their current operations under the second air interface protocol following a handoff from the first air interface protocol to (ii) a total number of access terminals currently operating under the second air interface protocol. By way of example, the first air interface protocol could be IS-856 and the second could be IS-2000. However, the method and system could be applied to other protocols of a hybrid system.

At step 404, the metric is used, at least as a partial basis, to adjust a dormancy period that at least one hybrid access terminal must wait before entering a dormant mode in which is looks for service under the first air interface protocol. Also in accordance with embodiments discussed above, the system may use a dormancy timer to determine when an access terminal operating under the second air interface protocol has remained inactive for at least dormancy period, and thus has entered a dormant state. Adjusting the dormancy period based, at least in part, on the metric allows the frequency with which hybrid access terminals may look for service under the first air interface protocol to be tuned according the rate at which hybrid access terminals hand off from the first air inter face protocol to the second air interface protocol.

7. Conclusion

An exemplary embodiment of the present invention has been described above. Those skilled in the art will understand, however, that changes and modifications may be made to this embodiment without departing from the true scope and spirit of the present invention, which is defined by the claims.

We claim:
1. In a hybrid wireless communication system having at least a first air interface protocol and a second air interface protocol, wherein hybrid access terminals capable of operating under both air interface protocols engage in data communications with the wireless communication system, a method comprising:
   determining a metric indicative of a rate at which hybrid access terminals operating under the first air interface protocol are handed off to the second air interface protocol; and
   based at least on the metric, adjusting a time period that at least one hybrid access terminal operating under the second air interface protocol must wait before entering an operational state in which the at least one hybrid access terminal looks for service under the first air interface protocol,
   wherein determining the metric comprises determining a subtotal number of hybrid access terminals currently operating under the second air interface protocol that each began their current operations under the second air interface protocol following a handoff from the first air interface protocol, and computing a ratio of the subtotal number to a total number of access terminals currently operating under the second air interface protocol.
2. The method of claim 1, wherein the first air interface protocol is IS-856 and the second air interface protocol is IS-2000.
3. The method of claim 1, wherein adjusting the time period comprises:
   determining that the ratio is within a particular range of values, the particular range being one of at least one non-overlapping ranges of values; and
   setting a value for the time period equal to a time-duration value associated with the particular range.

4. The method of claim 1, wherein determining the subtotal number comprises:
maintaining in the wireless communication system a historical record of handoffs of hybrid access terminals between the first air interface protocol and the second air interface protocol, the historical record containing at least information indicative of the subtotal number;
retrieving the information from the historical record; and
determining the subtotal number from the information.

5. The method of claim 1, wherein the operational state corresponds to a dormant state, the time period being measured by a dormancy timer that is set to expire upon passage of a dormancy period, and during which time period the at least one hybrid access terminal neither sends nor receives any packet data to or from the wireless communication system, and wherein adjusting the time period comprises:
setting the dormancy period to a value determined based at least on the metric.

6. In a hybrid cellular wireless communication system of a type providing both IS-2000 coverage and IS-856 coverage, wherein a radio access network comprising at least one base station serves a hybrid access terminal that is capable of operating under IS-2000 and IS-856, a method carried out by the radio access network comprising:
computing a ratio of (i) a subtotal number of hybrid access terminals currently operating under IS-2000 that each began their current operations under IS-2000 following a handoff from IS-856 to (ii) a total number of access terminals currently operating under IS-2000; and
based at least on the ratio, adjusting a time period that the hybrid access terminal, when operating under IS-2000, must wait before entering a dormant state in which it looks for service under IS-856.

7. The method of claim 6, wherein the time period is measured by a dormancy timer that is set to expire upon passage of a dormancy period, and during which time period the hybrid access terminal neither sends nor receives any packet data to or from the hybrid cellular wireless communication system, and wherein adjusting the time period comprises:
setting a value for the dormancy period based at least on the ratio.

8. The method of claim 7, wherein the hybrid access terminal has an IS-2000 active set of one or more sectors, the radio access network maintaining for each respective sector a respective dormancy timer associated with the hybrid access terminal, each respective dormancy timer having an associated respective dormancy period, and wherein:
computing the ratio comprises computing a respective sector-ratio for each sector in the hybrid access terminal's IS-2000 active set, each respective sector-ratio comprising a ratio of (i) a sector-subtotal number of hybrid access terminals currently operating in the sector under IS-2000 that each began their current operations under IS-2000 following a handoff from IS-856 to (ii) a sector-total number of access terminals currently operating in the sector under IS-2000, and
adjusting the time period further comprises determining respectively for each sector in the hybrid access terminal's IS-2000 active set a respective value for the respective dormancy period based at least on the respective sector-ratio.

9. The method of claim 8, further comprising:
determining a primary sector for the hybrid access terminal from among the hybrid access terminal's IS-2000 active set; and
setting the respective dormancy timer of each sector of the IS-2000 active set according to the respective dormancy period of the primary sector.

10. The method of claim 9, wherein each sector of the hybrid access terminal's IS-2000 active set transmits a respective pilot signal, and determining the primary sector for the hybrid access terminal comprises determining a sector from among the hybrid access terminal's IS-2000 active set for which the hybrid access terminal detects a strongest respective pilot signal.

11. The method of claim 8, wherein computing the respective sector-ratio for each sector in the hybrid access terminal's IS-2000 active set comprises:
in the hybrid wireless communication system, maintaining for each sector a historical record of handoffs of hybrid access terminals between IS-856 and IS-2000, the historical record containing at least information indicative of the sector-subtotal number;
for each sector, retrieving the information from the historical record; and
determining the sector-subtotal number from the information.

12. The method of claim 11, wherein at least one IS-2000 network entity supports IS-2000 coverage and at least one IS-856 network entity supports IS-856 coverage, and wherein maintaining for each sector a historical record of handoffs of hybrid access terminals between IS-856 and IS-2000 comprises:
providing a communicative connection between the IS-2000 network entity and the IS-856 network entity;
via the communicative connection, transferring handoff data between the IS-2000 network entity and the IS-856 network entity, the handoff data being indicative of at least one occurrence of a handoff between IS-856 and IS-2000 of at least one hybrid access terminal; and
generating the historical record of handoffs from the handoff data.

13. The method of claim 11, wherein retrieving the information comprises retrieving the information from a network entity selected from a group consisting of an Authentication-Authorization-Accounting (AAA) server, a Packet Data Serving Node (PDSN), a Base Station Controller, a Base Station Manager, an Element Management Subsystem, and a Radio Network Controller.

14. The method of claim 6, wherein adjusting the time period comprises:
determining that the ratio is within a particular range of values, the particular range being one of at least one non-overlapping ranges of values; and
setting a value for the time period equal to a time-duration value associated with the particular range.

15. The method of claim 14, wherein setting the value for the time period equal to the time-duration value associated with the particular range comprises performing a table lookup in a timer-value table, the timer-value table residing in a network entity and containing at least each of the at least one non-overlapping ranges of values and a respective, associated time-duration value.

16. In a hybrid cellular wireless communication system of a type providing both IS-2000 coverage and IS-856 coverage, wherein a radio access network comprising at least one base station serves a hybrid access terminal that is capable of operating under IS-2000 and IS-856, an improvement comprising:
means for computing a ratio of (i) a subtotal number of hybrid access terminals currently operating under IS-2000 that each began their current operations under IS-2000 following a handoff from IS-856 to (ii) a total number of access terminals currently operating under IS-2000; and means for adjusting a time period that the hybrid access terminal, when operating under IS-2000, must wait before entering a dormant state in which it looks for service under IS-856, the adjustment being based at least on the ratio.

17. The improvement of claim 16, wherein the improvement is disposed at least in part within the at least one base station.

18. The improvement of claim 16, wherein the time period is measured by a dormancy timer that is set to expire upon passage of a dormancy period, and during which time period the hybrid access terminal neither sends nor receives any packet data to or from the hybrid cellular wireless communication system, and wherein the means for adjusting the time period comprises means for setting a value for the dormancy period based at least on the ratio.

19. The improvement of claim 18, wherein the hybrid access terminal has an IS-2000 active set of one or more sectors, the radio access network maintaining for each respective sector a respective dormancy timer associated with the hybrid access terminal, each respective dormancy timer having an associated respective dormancy period, and wherein:

the means for computing the ratio comprises means for computing a respective sector-ratio for each sector in the hybrid access terminal's IS-2000 active set, each respective sector-ratio comprising a ratio of (i) a sector-subtotal number of hybrid access terminals currently operating in the sector under IS-2000 that each began their current operations under IS-2000 following a handoff from IS-856 to (ii) a sector-total number of access terminals currently operating in the sector under IS-2000, and the means for adjusting the time period further comprises means for determining respectively for each sector in the hybrid access terminal's IS-2000 active set a respective value for the respective dormancy period based at least on the respective sector-ratio.

20. The improvement of claim 19, further comprising:

means for determining a primary sector for the hybrid access terminal from among the hybrid access terminal's IS-2000 active set; and means for setting the respective dormancy timer of each sector of the IS-2000 active set according to the respective dormancy period of the primary sector.

21. The improvement of claim 19, wherein the means for computing the respective sector-ratio for each sector in the hybrid access terminal's IS-2000 active set comprises:

means for maintaining for each sector a historical record of handoffs of hybrid access terminals between IS-856 and IS-2000, the historical record containing at least information indicative of the sector-subtotal number;

means for retrieving, for each sector, the information from the historical record; and means for determining the sector-subtotal number from the information.

22. The improvement of claim 21, wherein the means retrieving the information comprises means retrieving the information from a network entity selected from a group consisting of an Authentication-Authorization-Accounting (AAA) server, a Packet Data Serving Node (PDSN), a Base Station Controller, a Base Station Manager, an Element Management Subsystem, and a Radio Network Controller.

23. The improvement of claim 16, wherein the means for adjusting the time period comprises:

means for determining that the ratio is within a particular range of values, the particular range being one of at least one non-overlapping ranges of values; and means for setting a value for the time period equal to a time-duration value associated with the particular range.

24. The improvement of claim 23, wherein the means setting the value for the time period equal to the time-duration value associated with the particular range comprises means for performing a table lookup in a timer-value table, the timer-value table residing in a network entity and containing at least each of the at least one non-overlapping ranges of values and a respective, associated time-duration value.

* * * * *